United States Patent [19]

Kraus et al.

[11] 4,357,829

[45] Nov. 9, 1982

[54] APPARATUS FOR TEMPERATURE CONTROL OF A RESISTOR USED FOR MEASUREMENT PURPOSES, ESPECIALLY IN INTERNAL COMBUSTION ENGINES

[75] Inventors: Bernd Kraus, Gerlingen; Otto Glöckler, Renningen, both of Fed. Rep. of Germany

[73] Assignee: Robert Bosch GmbH, Stuttgart, Fed. Rep. of Germany

[21] Appl. No.: 97,245

[22] Filed: Nov. 26, 1979

[30] Foreign Application Priority Data

Jan. 10, 1979 [DE] Fed. Rep. of Germany ....... 2900690

[51] Int. Cl.³ .............................................. G01F 1/68
[52] U.S. Cl. ........................................ 73/204; 73/118
[58] Field of Search .................... 73/204, 118, 116; 123/472, 478, 494

[56] References Cited

U.S. PATENT DOCUMENTS 4,089,214  5/1978  Egami et al. .......................... 73/116
4,196,622  4/1980  Peter ..................................... 73/204

OTHER PUBLICATIONS

Grant et al., "Fundamentals of Hot Wire Anemometry", in Symp. on Measurements in Unsteady Flow, 1962, p. 51.

*Primary Examiner*—Jerry W. Myracle
*Attorney, Agent, or Firm*—Edwin E. Greigg

[57] ABSTRACT

An apparatus for the temperature control of a resistor used for measurement purposes, in particular, in combination with air flow rate measurement purposes, in particular, in combination with air flow rate measuring devices in internal combustion engines for a vehicle wherein the temperature of the resistor with current flowing through it is regulated during the measurement phase and in particular, operational states of the system provided with the apparatus and/or at particular times, the flow of current through the resistor is increased for the purpose of burning off dirt particles, which would falsify the measurement result, from the surface of the resistor which is formed, for example, as a hot wire. The apparatus includes a memory for picking up a signal such as whether a particular engine temperature is present at the beginning of one operational cycle or not and when this temperature is present, a red-hot heating procedure is omitted when the engine is subsequently turned off. In addition, the increase in current for initiating the red-hot heating procedure may also be controlled in accordance with operational duration and driving distance of the vehicle and in accordance with time.

11 Claims, 1 Drawing Figure

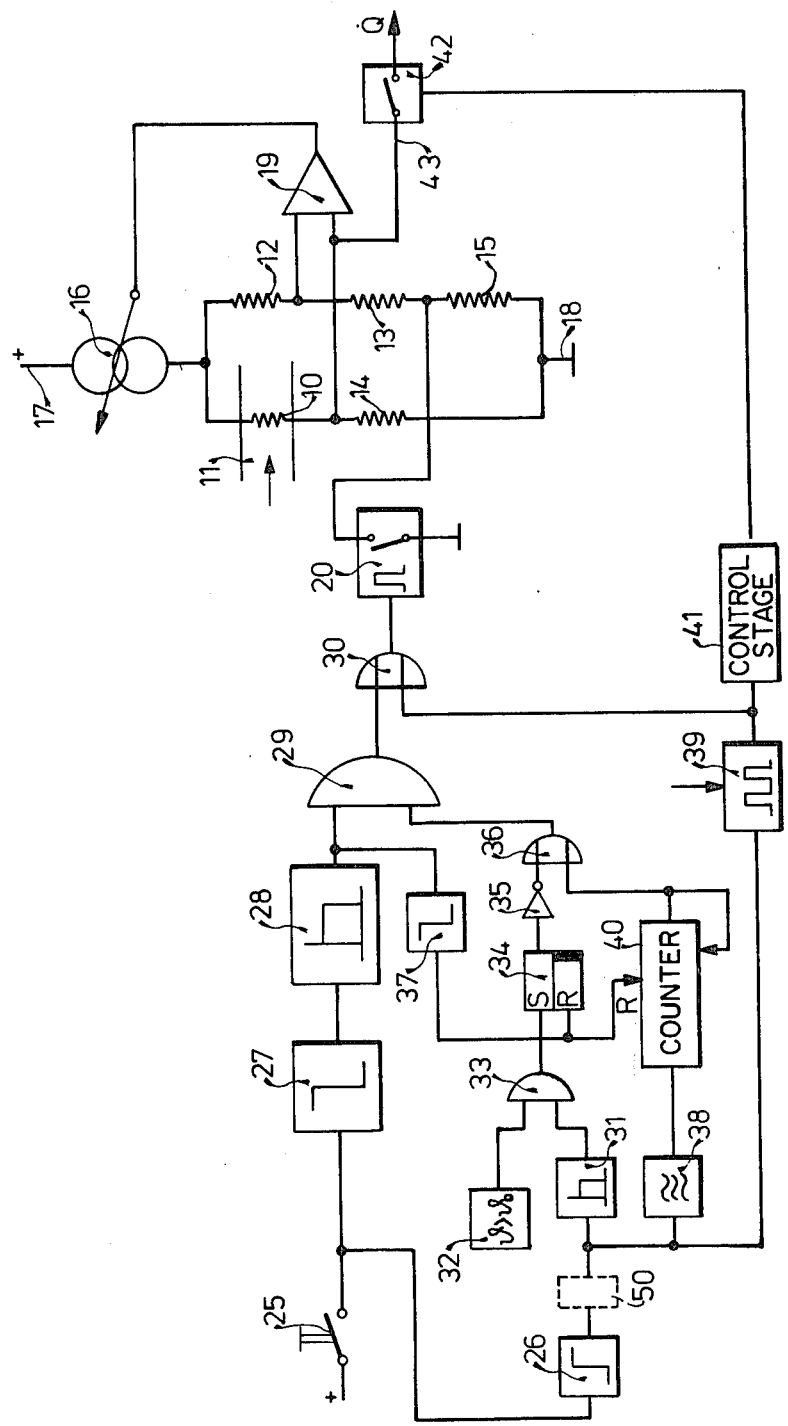

APPARATUS FOR TEMPERATURE CONTROL OF A RESISTOR USED FOR MEASUREMENT PURPOSES, ESPECIALLY IN INTERNAL COMBUSTION ENGINES

BACKGROUND OF THE INVENTION

An apparatus is known for measuring the induced air mass in internal combustion engines which apparatus includes a bridge circuit connected to a control apparatus, and a temperature-dependent resistor disposed in the induced air flow in one arm of the bridge circuit, the magnitude of the temperature and resistance of the resistor being regulated in accordance with the induced air mass. In such apparatus, the manipulated variable is a standard for the induced air mass. Theoretically, this apparatus produces good measurement results. However, because of the crude operation of the measurement apparatus in motor vehicles, problems occur, particularly after relatively lengthy operation because the surface of the temperature-dependent resistor becomes increasingly dirty.

U.S. Pat. No. 4,196,622, issued Apr. 8, 1980 to Peter, describes an apparatus for increasing the current through the temperature-dependent resistor of this known induced air mass measuring apparatus each time the engine is shut off until such time as the temperature of the temperature-dependent resistor reaches a predetermined temperature sufficient to burn off deposits from the surface of the resistor. However, when the engine is frequently shut off for short intervals of time, the number of burn-off operations performed on the temperature-dependent resistor is much greater than that required to assure good accuracy, and the service life of the resistor may be shortened by such frequent red-hot heating procedures. Also, when the engine is continuously operated for very long periods of time, the number of burn-off operations performed on the temperature-dependent resistor may be much less than that required to assure good measurement accuracy.

OBJECTS AND SUMMARY OF THE INVENTION

The apparatus in accordance with the invention for temperature control of a resistor used for measurement purposes has the advantage over the prior art in that the precise measurements can be constantly maintained, even over a very long operational period because, at particular operational states and/or at particular times, the flow of current through the resistor is increased in such a manner that deposits on the surface of the temperature-dependent resistor are burned off.

Thus, it has been shown to be particularly advantageous, when the apparatus is used in a motor vehicle as an air mass meter, to bring about an increase in current for red-hot heating of the resistor only whenever (after one operational cycle, for instance) the engine temperature has not yet reached a predetermined level upon starting. Such eventualities would be, for instance, pauses in operation which both occur frequently and are brief in duration. The intended reduction in the frequency of red-hot heating procedures serves, above all, to provide a longer service life of the resistors, which are embodied, for instance, as hot wires. Furthermore, it is appropriate to make the red-hot heating procedures time-dependent so as to remove deposits which may, for example, appear on the resistor, during long-term operation of the apparatus.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows one exemplary embodiment of the invention.

DESCRIPTION OF THE PREFERRED EMBODIMENT

In the single FIGURE of the drawing, an apparatus is shown for the temperature control of a resistor used for measurement purposes in combination with a hot-wire air mass meter in an internal combustion engine.

The hot wire used as the measurement resistor is designated by the reference numeral 10 and the resistor 10 is located inside an air intake manifold 11 which leads to the inlet valves of the internal combustion engine. This resistor 10 is one of the resistors of a bridge circuit which includes the further resistors 12, 13, 14 and 15. This bridge circuit is in series with a controllable current source 16 between a positive line 17 and a ground line 18. The connection points of the resistors 12 and 13 as well as of resistors 10 and 14 are linked to the inputs of a differential amplifier 19, whose output signal controls the current source 16. The actual air mass signal is also picked up at the connection point of the two resistors 10 and 14.

Heating the resistor 10 in the form of a hot wire to the red-hot state for purposes of burning off deposits results in the bypassing of the resistor 15 by means of a switch 20 and the bridge circuit is thus unbalanced in such a manner that more heating current flows through the hot wire 10.

There are various possibilities for determining the instant of onset of the red-hot heating procedure which are illustrated in the single FIGURE of the drawing by OR-type logic gates. These possibilities may be selected either singly or in combination with one another and the appropriate structural components and groups of components will then be uncoupled and omitted.

The apparatus for temperature control includes a starter or ignition switch 25 which is followed by differentiation stages 26 and 27 for the forward edge and the trailing edge of the switch output signal. On the output side, the differentiation stage 27 is coupled with a first timing circuit 28 in the form of a monostable multivibrator whose output in turn is fed to one input of an AND gate 29. This AND gate 29 is connected to an OR gate 30 and the short-circuit switch 20 for the resistor 15 of the measuring bridge.

The differentiation stage 26, as well, is followed by, among other elements, a timing circuit 31. The output of the timing circuit 31 fed together with an output signal of a temperature switch 32, to an AND gate 33. Following the AND gate 33 is a series circuit comprising a flip-flop 34 and an inverter 35, which inverter is connected on the output side, via an OR gate 36, to the second input of the AND gate 29. The reset input of the flip-flop 34 is connected via a differentiation stage 37 to the timing circuit 28 so as to respond to the trailing edge of the output signal of the timing circuit 28. The differentiation stage 26 is followed, not only by the timing circuit 31, but also by two pulse generators 38 and 39. A counter 40 follows the pulse generator 38 and its reset input R is coupled with the output of the differentiation state 37 and its (overflow) output is connected to the second input of the OR gate 36.

In an efficient manner, the pulse generator 38 represents a controllable tachometer generator or rpm transducer (which is controlled, for example, by the ignition signal), in order to be able to ascertain the distance covered by the vehicle equipped with this engine, or to ascertain the engine rpm. The second pulse generator 39, in contrast, is intended to function as a time transducer, in order to enable, from time to time, the heating of the resistor 10, embodied as a hot wire, in the air intake manifold 11 to the red-hot state. To this end, the output of the pulse generator 39 is connected on the one hand with one input of the OR gate 30 and, on the other hand, via a control stage 41 with a switch 42 in an output line 43 of the air flow rate signal.

The apparatus whose structure is described above and illustrated in the single FIGURE of the drawing functions as follows:

If the ignition switch 25 is closed, then the differentiation stage 26 produces an output signal and thus furnishes a trigger signal to the timing circuit 31. When the engine temperature is above a certain value $\theta$, the flip-flop 34 is set, its output signal becomes positive and, as a result of the inverter 35, no positive signal arrives at the AND gate 29. The output signal of the counter 40 and of the pulse generator 39 is assumed also to be zero. As a result, the switch 20 remains open and the resistor 10, as a hot wire, functions, together with the other circuitry of the bridge, as an air mass meter.

After the expiration of the pulse duration of the output signal of the timing element 31, the output signal of the AND gate 33 also returns to zero. The flip-flop 34, however, remains set.

If the ignition switch 25 is now opened again, then the differentiation stage 27 triggers the timing circuit 28, at whose output a positive signal appears for a predetermined period. Because, during this period, the flip-flop 34 remains set, different signals are present at the two inputs of the AND gate 29 and the switch 20 is not closed. After the expiration of the duration of the output signal of the timing circuit 28, the flip-flop 34 returns to its initial position.

So long as the temperature of the engine is above the predetermined value $\theta$, then the flip-flop 34 will remain set during a further starting procedure, and thus a renewed red-hot heating procedure after the end of the operational current will be precluded.

If the initial temperature is lower than $\theta$ ($\approx 80°$ C.), then when the switch 25 is switched on, the flip-flop 34 is not set as the AND gate 33 is blocked. When the engine is next shut off, a red-hot heating procedure takes place.

It is conceivable that there will be cases in which the kind of red-hot heating procedure control described above will result in too few red-hot heating procedures. This is because whatever interruptions occur in driving, they are so brief that there is an insufficient cooling down of the engine and thus no subsequent red-hot heating procedure. This situation is handled by the circuit group having the pulse generator 38 and the counter 40 in that the distance traveled or the number of rpm of the engine is evaluated as an additional criterion for the red-hot heating procedure. The appropriate data are furnished by the pulse generator 38 which is controlled in accordance with rpm or with vehicle velocity. The output of the pulse generator 38 is fed to the input of the counter 40 and when the counter 40 arrives at its overflow point, it furnishes a signal at its output, stops the counting procedure, and applies one input of positive potential to the AND gate 29, via the OR gate 36. As a result, after the next shut-off procedure, the hot wire is heated red-hot.

It may be efficient to heat the hot wire red-hot not only after the shut-off of the engine, but also at particular time intervals, for example. As one example, representative of further possibilities, the stationary operation of an engine will be considered here. The time-dependent red-hot heating procedure is triggered by means of a time pulse transducer which is controllable if necessary. That is, the output signal of the pulse generator 39 finally acts, via the OR gate 30, on the switch 20. Care must then be taken only that during this red-hot heating procedure, the air mass signal is uncoupled from the subsequent stage. This end is reached by the switch 42 in the air mass signal conductor 43, with the switch 42 being actuated by the control stage 41.

In the single FIGURE of the drawing, following the differentiation element 26 for recognition of the switching on of the ignition switch 25, there is provided a delay element 50 indicated by dot-dashed lines. This delay element acts to prevent the switching procedures taking place during the phase where the engine is turned on or immediately thereafter, because during this phase, if the vehicle battery is poor, the supply voltage can drop very severely possibly leading to incorrect switching.

The apparatus shown in the single FIGURE of the drawing for temperature control of a resistor for measurement purposes having discrete structural elements or groups of elements may also be accomplished by means of a computer. This is advantageous, particularly when the apparatus is to be used in a motor vehicle wherein the injection time (for example) is furnished by means of a computer program. In such an arrangement, all that needs to be done then is to introduce an interrogation into the program which, immediately after starting, compares the engine temperature with a predetermined value and stores the temperature information in memory. If the engine temperature is below the predetermined value $\theta$, then, upon the next successive shut-off, the red-hot heating procedure is blocked in accordance with the above description.

In summary, the primary advantage of the described apparatus for temperature control of a measurement resistor is the compromise between the requirement for the maximum number of red-hot heating procedures in view of attaining a precise measurement result and the minimum number of red-hot heating procedures so that the service life of the resistor, which may be formed, for example, as a hot wire, is as long as possible.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An apparatus for controlling the temperature of a resistor associated with a drive system and used for measurement purposes during operation of the system, which comprises:

current supply means for supplying current to said resistor;

current regulating means for regulating the flow of current through said resistor during the measurement;

current increasing means for increasing the flow of current through said resistor in dependence on at least one system condition including at least one system operating condition; and current control means for controlling the magnitude and duration of the current increase by said current increasing means to achieve a desired "burn-off" of deposits on the surface of said resistor.

2. An apparatus in accordance with claim 1, wherein said current increase by said current increasing means occurs at the end of one operational phase of the system.

3. An apparatus in accordance with claim 2, including sensing means for providing a temperature signal and wherein said current increase by said current increasing means is dependent on said temperature signal at the beginning of one operational phase of said system.

4. An apparatus in accordance with claim 3, wherein said current increase occurs only when the temperature at the beginning of said operational phase is below a preselected value.

5. An apparatus in accordance with claim 3, including memory means and means for storing said temperature signal in said memory means only after a predetermined elapse of time after the beginning of one operational phase of said internal combustion engine.

6. An apparatus in accordance with claim 1, including sensing means for providing a temperature signal and wherein said current increase by said current increasing means is dependent on said temperature signal at the beginning of one operational phase of said system.

7. An apparatus in accordance with claim 6, wherein said current increase occurs only when the temperature at the beginning of said operational phase is below a preselected value.

8. An apparatus in accordance with one of claims 1-4, 6 and 7, wherein said current increase is dependent on the duration of operation of said system.

9. An apparatus in accordance with one of claims 1-4, 6 and 7, wherein said system comprises a motor vehicle and the current increase is dependent on the distance traveled by said vehicle.

10. An apparatus in accordance with claim 6, including memory means and means for storing said temperature signal in said memory means only after a predetermined elapse of time after the beginning of one operational phase of said system.

11. An apparatus in accordance with one of claims 1-7 and 10, wherein said system comprises an internal combustion engine having an intake manifold in which said resistor is disposed, and said resistor is used for measurement purposes in an induced air mass measuring device for the internal combustion engine.

* * * * *